United States Patent [19]
Giuliani et al.

[11] Patent Number: 5,394,662
[45] Date of Patent: Mar. 7, 1995

[54] SEAL ASSEMBLY FOR A LOADING DOCK SHELTER

[75] Inventors: Jon Giuliani, Whitefish Bay, Wis.; William Triervieler, Dubuque, Iowa; David J. Hoffmann, Dubuque, Iowa; Thomas J. Boffeli, Dubuque, Iowa; Thomas J. Medley, Dubuque, Iowa; Robert Frommelt, Perosta, Iowa; Kenneth Lenz, Cuba City, Wis.; Thomas E. Duccini, Dubuque, Iowa

[73] Assignee: Rite-Hite Corporation, Milwaukee, Wis.

[21] Appl. No.: 79,145

[22] Filed: Jun. 17, 1993

[51] Int. Cl.6 .............................................. E04F 10/04
[52] U.S. Cl. .................................................. 52/173.2
[58] Field of Search .............. 52/173 DS, 2.11, 2.12; 160/181, 124; 49/475.1

[56] References Cited

U.S. PATENT DOCUMENTS

| | | |
|---|---|---|
| 3,403,489 | 10/1968 | Frommelt et al. . |
| 3,500,599 | 3/1970 | Sciolino . |
| 3,638,667 | 2/1972 | Frommelt et al. . |
| 3,854,257 | 12/1974 | Lobel . |
| 3,875,954 | 4/1975 | Frommelt et al. . |
| 3,915,183 | 10/1975 | Frommelt . |
| 3,934,380 | 1/1976 | Frommelt et al. . |
| 4,062,157 | 12/1977 | Potthoff ........................ 52/173.2 |
| 4,213,279 | 7/1980 | Layne . |
| 4,328,273 | 5/1982 | Yackiw . |
| 4,349,992 | 9/1982 | Layne ............................ 52/173.2 |
| 4,574,543 | 3/1986 | Crosson ......................... 52/173.2 |
| 4,601,142 | 7/1986 | Frommelt . |
| 4,638,612 | 1/1987 | Bennett . |
| 4,679,364 | 7/1987 | Fettig et al. . |
| 4,711,059 | 12/1987 | Layne . |
| 4,718,207 | 1/1988 | Frommelt . |
| 4,724,648 | 2/1988 | Diepholder ..................... 52/173.2 |
| 4,799,341 | 1/1989 | Frommelt ....................... 52/173.2 |
| 4,799,342 | 1/1989 | Klevnjans . |
| 4,805,362 | 2/1989 | Frommelt et al. . |
| 4,825,607 | 5/1989 | Frommelt ....................... 52/173.2 |
| 4,873,800 | 10/1989 | Frommelt et al. . |
| 4,873,801 | 10/1989 | Winters ........................... 52/173.2 |
| 5,007,211 | 4/1991 | Ouellet ........................ 52/173.2 X |
| 5,195,285 | 3/1993 | Alten ............................. 52/173.2 |

*Primary Examiner*—Carl D. Friedman
*Assistant Examiner*—Beth A. Aubrey
*Attorney, Agent, or Firm*—Leydig, Voit & Mayer, Ltd.

[57] ABSTRACT

A loading dock shelter having a resilient and flexible seal assembly is provided for forming a substantially air-tight seal between the dock opening and the truck. The seal assembly comprises a support or panel member which is adapted to attach to the loading dock frame and to support a seal member. The seal member has a substantially hook-shaped cross-section adapted to hookedly engage the incoming truck and is capable of resiliently flexing between a hook-shaped cross-section in the disengaged position and a substantially straight cross-section in the sealing position in response to the truck. The hook-shaped cross section permits the seal member to sealably engage the interior wall of the truck, and, in the alternative, will seal against the peripheral edge of the truck, or the exterior wall of the truck depending on the size and position of the truck. The flexible seal member has a seal end adapted to bend and conform to the surface contours of the truck surface in the sealing position so as to form a substantially air-tight seal therewith.

17 Claims, 4 Drawing Sheets

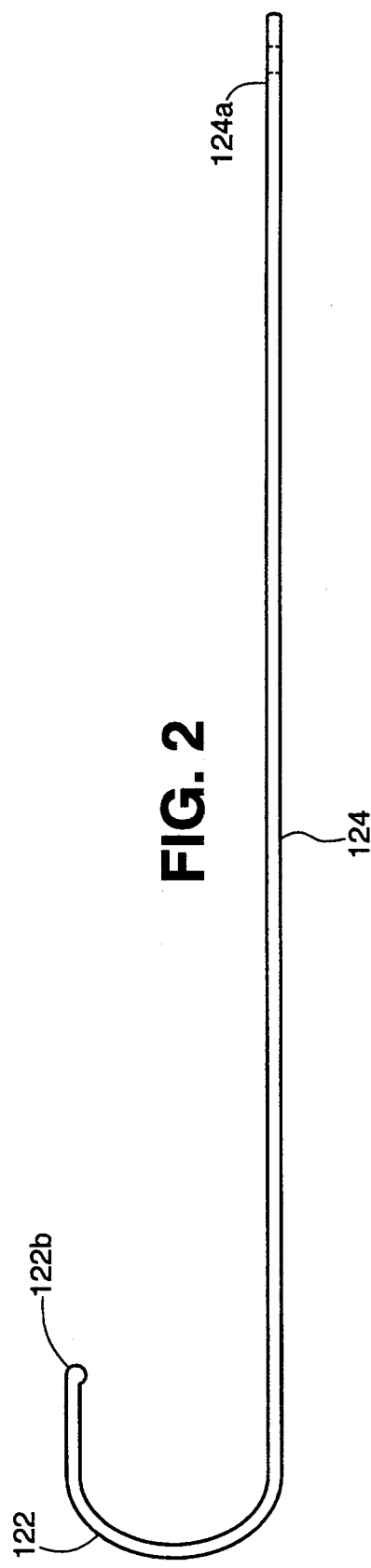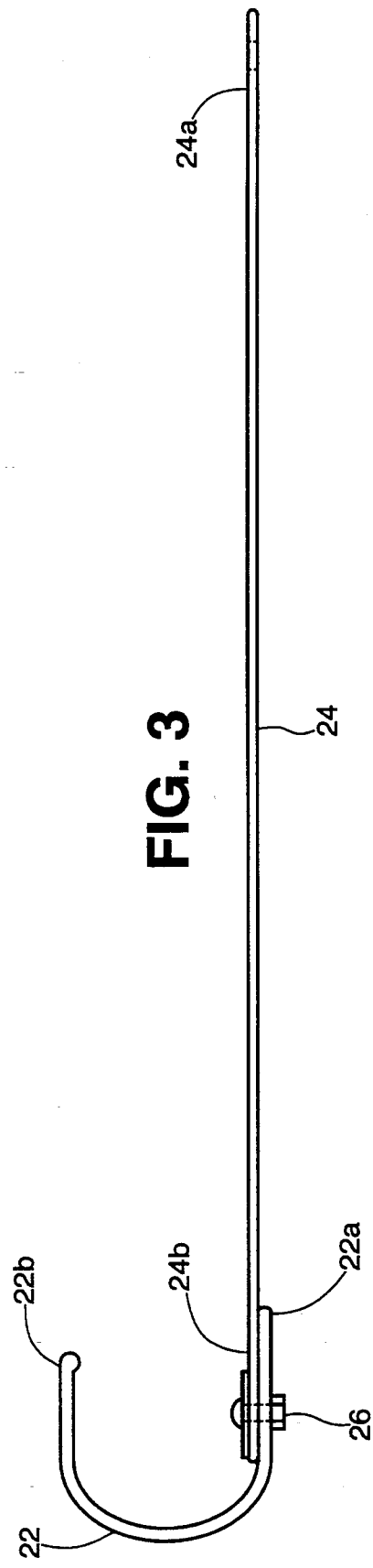

SEAL ASSEMBLY FOR A LOADING DOCK SHELTER

FIELD OF THE INVENTION

The present invention relates generally to loading dock shelters and, more particularly, to a seal device for engaging the cargo portions of a truck adjacent to a loading dock.

BACKGROUND OF THE INVENTION

Trucks having open rear cargo bays are typically backed into alignment with a loading dock or other doorway to facilitate loading and unloading of the vehicle. A significant space is typically formed between the truck and the building which exposes the interiors of the building and the truck, and the workers and materials to the outside environment during loading and unloading. Attempts to seal the gap have included loading dock shelters which have utilized fabric or sheet material to form walls and/or curtains between the opening and the truck and loading dock seals which utilize resilient, compressible pad members, generally disposed at the lateral and top edges of the opening, to sealably engage the exterior walls or rear edges of the truck.

Unfortunately, typical loading dock seals and shelters have several disadvantages. Since the dock seals which engage the rear edges of the truck must be disposed so that they overlap or extend into the truck's doorway to ensure that the rear edges of the truck engage the compressible pad members, they have reduced the size of the passageway, limiting access into the truck and generally inhibiting loading and unloading of the truck.

Conventional dock seals have also been unable to accommodate uneven truck surfaces, projecting hinges and the like and thus, have been unable to create an air tight seal. The same has been true for conventional dock shelters. With respect to the dock seals which seal against the exterior truck walls, a gap between open hinge-type doors and the truck body allows access of the outside environment to the loading area regardless of the tightness of the seal established between the dock seal and the exterior wall of the truck.

Many conventional dock seals are relatively difficult to maintain. Since many conventional dock seals have rigid right angles, they have been subject to impact damage from the trucks. Attempts to provide hinged dock seals or compressible frames have not been entirely satisfactory because they increase manufacturing costs. The compressible pads also require the truck to exert considerable force on the pad and the building wall in order to obtain the proper sealing engagement, increasing abrasion and wear on the seal and curtain materials, particularly where the rear corners and edges of the truck rub against the material.

Since many loading docks have inclined driveway grades, many loading dock shelters must be individually manufactured in order to accommodate such grades and maintain the proper perpendicular orientation between the truck walls and the seals. This increases manufacturing costs.

OBJECTS AND SUMMARY OF THE INVENTION

It is an object of the present invention to provide an improved sealing device for a loading dock shelter.

Another object of the present invention is to provide a loading dock sealing device which is capable of sealing against an interior wall of the truck, and, in the alternative, will seal against the exterior wall or the rear peripheral edge of the truck depending on the size and position of the truck, and thus increase the likelihood of a good seal.

It is an object of the present invention to provide a loading dock seal which sealably engages the uneven surface configurations of the truck.

A related object of the present invention is to provide a loading dock sealing device which closely conforms to the truck surface resulting in minimal obstruction of the cargo bay opening during loading and unloading.

A further object of the present invention is also to seal any hinge gap formed between the side walls of a truck and its hinged open doors.

It is another object of the present invention to provide a loading dock sealing device which automatically engages the truck in response to the rearward movement of the truck.

Still another object of the present invention is to provide a loading dock sealing device which sealably engages the truck regardless of the truck body width, the driveway incline, or off-center or skewed position of the truck body.

It is an object of the present invention to provide a sealing device which functions in an efficient and practical manner, is easily and economically fabricated, and is adapted for operation with vehicles of various widths and heights.

A loading dock shelter having a resilient and flexible seal assembly is provided for forming a substantially air-tight seal between the dock opening and the truck. The seal assembly is flexibly mounted on each side of the dock opening for movement between disengaged and sealing positions in response to movement of the truck into and out of the loading dock. In the disengaged position, the seal assembly is spaced outwardly from the building wall and the loading dock so that it does not interfere with the normal operation of the loading dock. The seal assembly also projects into the path of the incoming truck so that the rear peripheral edges of the incoming truck engage the seal assembly.

In one embodiment, the seal assembly comprises a thin-walled, resilient, and flexible support or panel member and a seal member. The support member, which is adapted to attach to the loading dock frame and to support the seal member, has a substantially straight cross-section in the disengaged position which is capable of resiliently flexing to an arcuate-shaped cross-section orientated towards the dock opening in the sealing position in response to the truck.

The seal member has a substantially hook-shaped cross-section adapted to hookedly engage the peripheral edge of the incoming truck. It is capable of resiliently flexing between its hook-shaped cross-section in the disengaged position and a substantially straight cross-section in the sealing position in response to the truck. The hook-shaped cross section permits the seal member to sealably engage the interior wall of the truck or the peripheral edge or exterior wall of the truck if the truck's position is off-center or skewed or if the truck's size is atypical. The seal member has a seal end adapted to bend and conform to the surface contours of the truck surface in the sealing position so that it forms a substantially air-tight seal with the truck surface.

In another embodiment, the seal assembly may be formed in separate sections of different stiffness joined together to provide optimum strength and flexibility over the length of the seal assembly. It is preferable that the support member is stiffer than the seal member so as to provide adequate support for the seal assembly and to resist collapse or sagging of the seal assembly whereas the seal member is relatively flexible so as to give the seal assembly a soft sealing end adapted to sealably engage the truck surface. The flexibility or stiffness of the individual support and seal members may be varied along their respective lengths to provide the desired degree of flexibility and strength at different lateral positions in the seal assembly.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is an enlarged top plan view of one embodiment of the seal assembly of FIG. 1;

FIG. 3 is an enlarged top plan view of a second embodiment of the seal assembly of FIG. 1;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
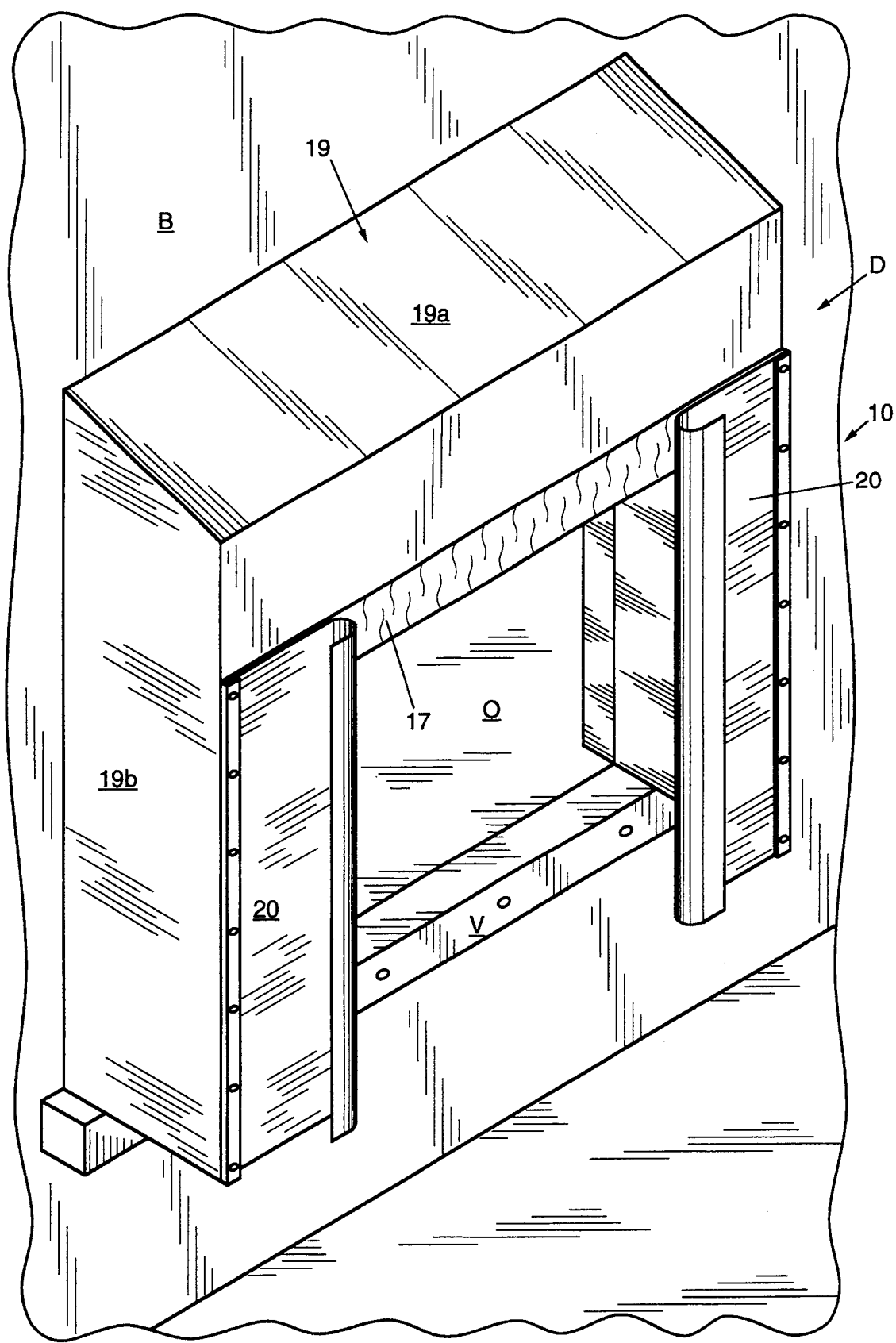
FIG. 1 is a perspective view of a loading dock opening and a loading dock shelter having a resilient seal assemble in accordance with the present invention.
Figure 5:
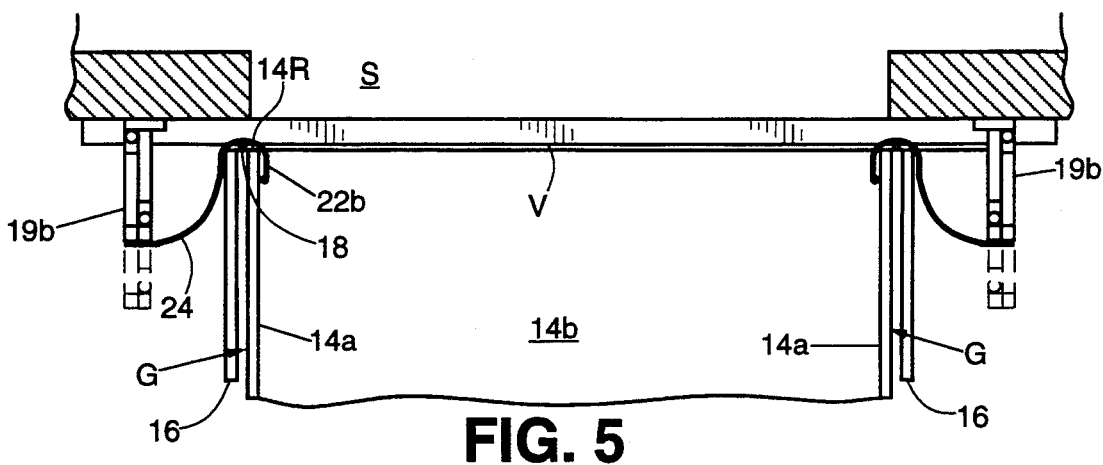
FIG. 5 is a top plan view of the loading dock shelter of FIG. 1 showing the seal assembly in a sealed position for sealably engaging the cargo door of a truck parked in loading dock.
Figure 6:
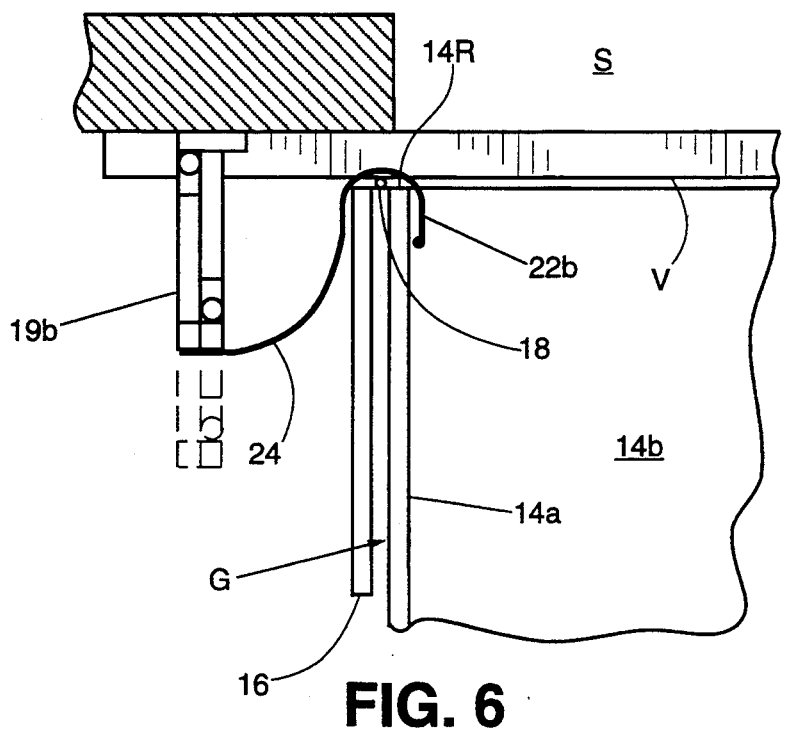
FIG. 6 is an enlarged view of FIG. 5 showing the seal assembly sealing the interior wall of the truck and about the rear peripheral edge of the hinge type door disposed adjacent and parallel to the exterior wall.
Figure 8:
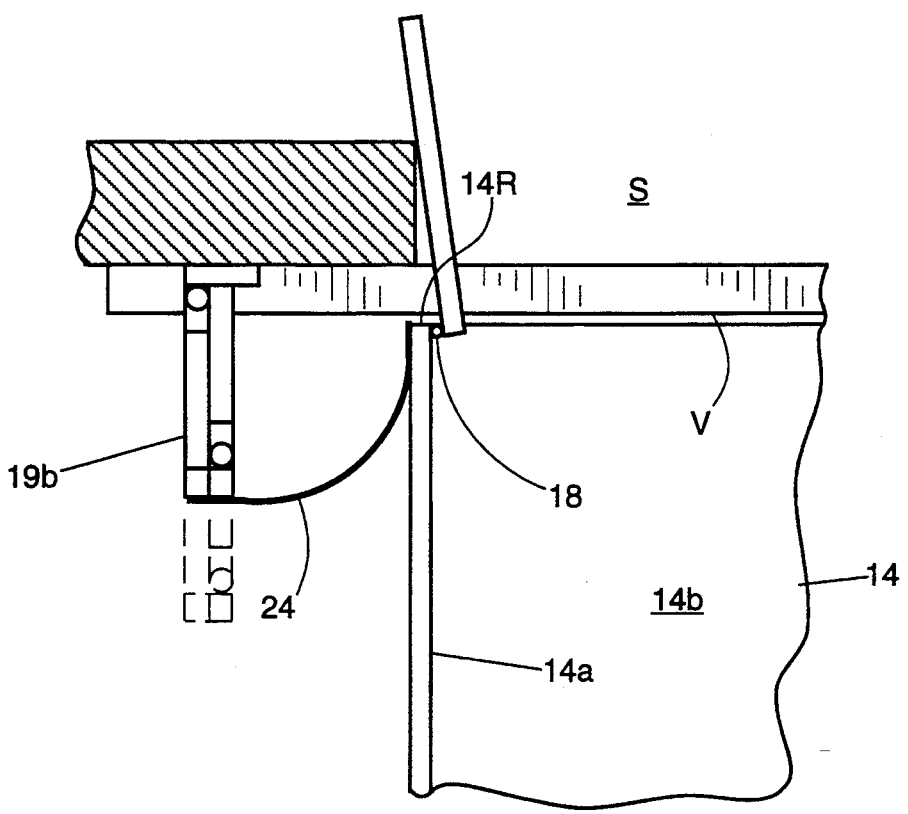
FIG. 8 is an enlarged top plan view showing the seal assembly sealing along the exterior wall of the truck having an inwardly opening door.

Referring to the drawings and more particularly to FIG. 1, one embodiment of a loading dock shelter 10 having a seal assembly in accordance with the present invention is mounted adjacent a conventional loading dock D normally provided in warehouses, truck terminals, manufacturing plants and the like where raw materials and products are received and/or dispatched by trucks 14. The truck 14 will have a cargo bay defined by side walls 14a, truck bed 14b, a front wall (not shown), a ceiling (not shown) and a door 16 which extends laterally across the rear of the truck 14 in the closed position. In many trucks, the doors 16 will pivot between the closed position and an open position wherein they are substantially adjacent and parallel to the exterior truck walls 14a and form a gap G between the door 16 and the wall 14a as shown in FIGS. 5–6. In other trucks, the doors 16 will pivot inwardly into the loading dock opening O as shown in FIG. 8 or slide upwardly to the cargo ceiling (not shown). It will be appreciated that the truck 14 may have hinges 18, handles, hooks or the like projecting from the rear peripheral edge 14r of the truck 14. The rear peripheral edge 14r is generally defined by the rear vertical edge of the truck walls 14a.

The conventional loading dock D normally has a dock opening O in a building wall B and a horizontal surface or deck S over which loading equipment such as forklift trucks and the like and dock personnel maneuver during the loading and unloading operation. The dock D may be provided with a leveler assembly (not shown) which is adapted to compensate for height differentials between the deck S and the upper supporting surface of the truck bed. The leveler assembly is customarily disposed within a pit (not shown) subjacent the deck S of the dock D and is well known in the art. In addition, the dock D normally includes a vertical wall V or surface against which the rear end of the truck 14 abuts during the loading and unloading operations. The surface V may be provided with suitable bumpers or fenders (not shown) which are engaged by the rear of the truck 14 thereby preventing damage or defacement of either the dock D or the truck 14 when the truck 14 is backing into position. The loading dock shelter 10 is intended to effectively and readily provide a substantially air-tight seal between the dock opening O and the truck 14 to prevent the movement of air between the inside and outside of the building B during the loading and unloading operation.

In the embodiment illustrated in FIG. 1, the loading dock shelter 10 comprises a frame assembly 19 rigidly attached to the periphery of the dock opening O, a seal assembly 20 mounted to the frame assembly 19 on each side of the dock opening O, and a curtain member 17 pivotally attached to the top of the frame assembly 19 to seal the gap formed between the top of the truck 14 and the frame assembly 19.

The conventional frame assembly 19 comprises a header frame 19a disposed along the top of the dock opening O and two side frames 19b projecting downwardly from the ends of the header frame 19a along the lateral edges of the opening O. As will be appreciated by those skilled in the art, the side frames 19b of loading dock shelter 10 may utilize a rigid frame structure or a retractable or compressible frame, or any other frame structures capable of supporting the seal assembly 20. The frame assembly 19 may be secured to the wall B by suitable means such as bolts or the like. The frame assembly 19 extends outwardly from the wall B for providing a generally rigid structure capable of supporting either the seal member 20, the curtain 17, or both in a spaced relation from the wall B. Thus, unlike many conventional loading dock seals and shelters, it is not necessary that the loading dock shelter 10, the seal members 20, or the curtain 17, project into the dock D or truck openings, thereby minimizing or eliminating any interference with the loading/unloading operation.

In accordance with certain objects of the present invention, a seal assembly 20 is resiliently and flexibly mounted along each lateral side of the dock opening O so that the truck 14 may fit between the two seal assemblies 20 and a seal may be formed between the truck 14 and the seal assembly 20 when the truck 14 is parked adjacent the loading dock D for loading/unloading. Although the embodiments illustrate two seal assemblies 20 disposed on either side of the dock opening O, it will be appreciated that, in other embodiments (not shown), only one seal assembly 20 may be utilized or a seal assembly 20 may be disposed in a substantially horizontal orientation at the top of the frame assembly 12a so as to sealably engage the top of the truck 14. Since each seal assembly 20 is identical in construction, only one seal assembly 20 is described below.

Figure 4:
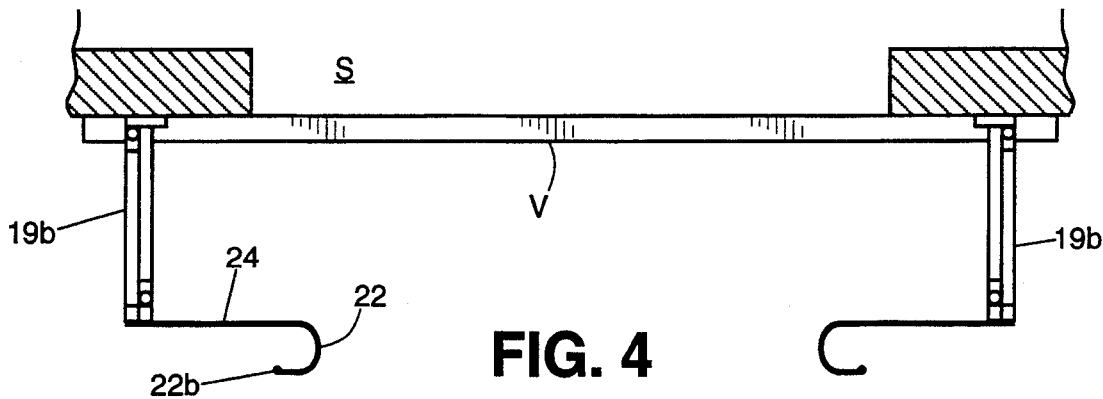
FIG. 4 is a top plan view of the loading dock shelter of FIG. 1 showing the seal assembly in the disengaged position for receiving a truck.

The seal assembly 20 resiliently flexes between a first, disengaged or open position (as shown in FIGS. 1 and 4) and a second, engaged or sealing position (as shown in FIGS. 5-8) in response to the movement of the truck 14 into and out of the loading dock D. In the disengaged position as shown in FIG. 4, the seal assembly 20 is spaced outwardly from the wall B and the loading dock D so as not to interfere with the normal operation of the loading dock D and so as to project into the path of the truck 14 so that the rear peripheral edge 14r of the truck 14 may engage the seal assembly 20 as the truck 14 backs into the loading dock. After the truck 14 initially engages the seal assembly 20, the rearward movement of the truck 14 resiliently bends the seal assembly 20 from the disengaged position (as shown in FIGS. 1 and 4) to the sealing position (as shown in FIGS. 5-8). In the sealing position, the seal assembly 20 is adapted to sealably engage and substantially conform to the contours of the interior surface of the truck wall 14a, so that it does not block or otherwise interfere with the normal loading/unloading of the truck 14 and loading dock D unlike many conventional seals. If engagement of the interior wall is not achieved because of the size or position of the truck, the seal assembly will, in default, conform to the contours of the rear peripheral edge 14r or the exterior surface of the truck wall 14a.

The seal assembly 20 comprises a thin-walled seal member 22 and a support or panel member 24 which may be formed as an integral and unitary assembly or as a plurality of separate elements. In the embodiment illustrated in FIG. 3, for example, the seal and panel members 22, 24 are formed of two separate elements which are attached together by a plurality of bolts 26 or the like whereas the seal and panel members 22, 24 are formed as a single integrally extruded assembly in the embodiment illustrated in FIG. 2. It is preferable that the vertical length of the seal assembly 20 be sufficient to engage and seal substantially the entire length of the truck wall 14a.

In the illustrated embodiments, the seal member 22 preferably has a generally thin-walled, hook- or U-shaped cross-section although it may have any other desired shape or size adapted to sealably engage the surface of the truck 14. Referring to FIG. 3, it will be seen that the seal member 22 has a first or mounting end 22a which is adapted to be attached to the support member 24 without sagging or collapsing and a second or sealing end 22b which is adapted to sealably engage the truck walls 14a and create a substantially air tight seal between the seal member 22 and the truck surface.

Figure 7:
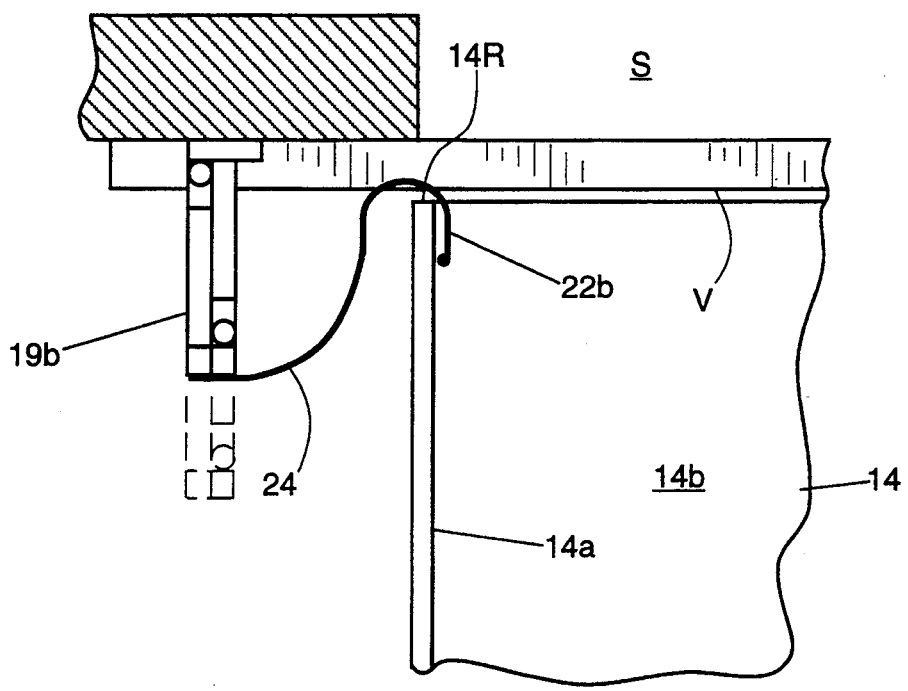
FIG. 7 is an enlarged top plan view showing the seal assembly sealing along the interior wall of the truck wall.

The seal member 22 may resiliently flex between the disengaged and sealing positions in response to the movement of the truck 14. In the disengaged position, as illustrated in FIG. 4, the hook-shaped seal member 22 is generally spaced intermediate the dock opening O and the incoming truck 14 so as to hookedly engage the peripheral edge 14r of the incoming truck 14. In response to the rearward movement of the truck 14 towards the dock opening O, the seal end 22b resiliently bends and conforms to the surface contours of the truck 14. The resilient and flexible nature of the sealing end 22b permits the seal member 22 to accommodate projecting hinges 18 and the like. The shape of the seal member 22 in the sealing position will depend on the surface contours of truck. It is preferable the U-shaped seal member 22 be sufficiently wide so that the sealing end 22b can hookedly engage the interior surface of the truck walls 14a. It has been found that spacing the mounting and sealing ends 22a, 22b apart by about 4 inches is sufficient to permit the seal member 22 to hookedly engage the interior walls 14a of most types of trucks 14. Although it is preferable that the seal member 22 maintain its U-shape so as to hookedly engage the interior surface of the truck wall 14a (as shown in FIG. 7), the seal member 22 may flex between the initial U-shape in the disengaged position and a substantially straight shape in the engaged position (as shown in FIG. 8). The seal member extends to a substantially straight cross-section, for example, when the peripheral edge 14r is positioned too far rearwardly or when the truck is parked on an incline or is off-center or skewed relative to the loading dock D. The seal member 22 is also flexible along its vertical length which permits the sealing end 22b to conform to and accommodate uneven truck surfaces, such as projecting hinges 18, or a truck parked on an incline in contrast to many conventional seals which have relatively rigid and flat seal surfaces which leave an air space between the seal member 22 and the truck 14. Thus, the seal member 22 will form a substantially air-tight seal with the truck regardless of truck's shape, size or orientation relative to the loading dock D.

The panel or support member 24 is a generally straight, curtain-like member which has a first lateral edge 24b adapted to be attached to the frame assembly 12 and a second lateral edge 24b adapted to receive the seal member 22. The panel member 24 may be made of any material having sufficient structural integrity to withstand the stresses and forces exerted on the support member 24 when the truck 14 impacts the seal assembly 20 and bends the seal assembly 20 between the disengaged and sealing positions. The support member 24 may be attached to the seal member 22 or the frame assembly 12 by any method known to those skilled in the art including, for example, bolts, screws and the like. The support member 24 is flexible and bends between the disengaged position (shown in FIG. 4), in which the support member 24 is generally straight and parallel to the building wall V and the sealing position (shown in FIGS. 5-8) in which the support member 24 flexes to a generally arcuate shape orientated towards the building wall V. The ability of the panel member 24 to flex and bend in response to the truck impact permits the present seal assembly 24 to be mounted to a rigid frame assembly without the need for a collapsible frame assembly required by earlier technology. Of course, the seal assembly 22 of the present invention may be mounted on a collapsible frame assembly, if desired, as is illustrated in FIGS. 4-8.

The seal assembly 20 may be made of any material including, for example, synthetic and natural rubbers, elastomers or polymers, having the desired characteristics as will be well known to those skilled in the art. The material is preferably abrasion resistant and will be flexible but still have sufficient structural integrity so that it will not collapse or sag. A material which has been found to be suitable for fabricating the seal member 22 is ethylene propylene rubber having a durometer from about 80 to about 90 Shore A and preferably at about 85 Shore A and will meet most requirements for typical loading dock shelter and truck applications. It has been found that a seal member 22 having cross section of about ¼ inch will have the requisite structural integrity to withstand the truck impact while still having the necessary flexibility to sealably engage the truck surfaces. It will be appreciated that such a thin walled structure minimizes or eliminates obstruction of the cargo bay's doorway.

The support member 24 is preferably fabricated of conventional vinyl and reinforcing stay members as is known to those skilled in the art. The support member 24 may also be fabricated from the same elastomeric materials as the seal member 22, or from conventional foam materials such as polyurethane foam. It will be appreciated that the seal member 22 may be attached to the compressible foam pads found in existing dock shelters and seals.

It is generally desirable that the support member 24 is relatively stiffer so as to provide adequate support for the seal assembly 20, to resist collapse or sagging and to otherwise withstand the impact of the truck 14 whereas the seal member 22 is relatively flexible so as to give the seal assembly 20 a soft seal end 22b adapted to sealably engage the truck surface. Thus, in the embodiment illustrated in FIG. 2, the seal assembly 20 may be formed in separate sections of different stiffness joined together to provide optimum strength and flexibility over the length of the seal assembly 20. The respective support and seal members 22, 24 may also be fabricated of a material having a uniform durometer or it may be fabricated of different blends of materials selected to provide a variable durometer providing the desired degree of flexibility or strength along the length of each portion. The seal member 22 may be fabricated, for example, by a conventional extrusion process such that the flexibility varies along its length wherein the first end 22a is relatively stiff to provide a stronger attachment end and the second end 22b is relatively flexible to permit the seal member 22 to more readily conform to the contours of the truck surface.

Instead of separate seal and support members 22, 24, as shown in FIG. 3, the seal assembly 20 may also be formed by an extrusion process to provide an integral seal and support member 122, 124, as shown in the embodiment illustrated in FIGS. 5–8. As in the first embodiment, the first end 124a of the panel 124 is attached to the frame assembly 12a and has enough structural integrity to support the seal assembly 20 whereas the seal end 122b is relatively flexible so as to resiliently and sealably engage the truck surfaces.

Since the seal assembly 20 has a thin walled structure, especially relative to conventional compressible pad seals, and also due to the ability of the seal assembly 20 to bend or deform to conform to the surface contours of the truck surface, it should now be appreciated that the seal assembly 20 minimizes any obstruction to the passageway between the loading dock D and the cargo bay. By covering the projecting hinges 18 or other projections on the peripheral edge of the cargo bay, the seal assembly 20 also protects the workers.

In order to operate the loading dock shelter 10 and the seal assembly 20, the truck 14 backs into the loading dock D in a conventional manner. The seal assembly 20 is initially in the first or disengaged position as illustrated in FIG. 4 so that it projects into the rearward path of the truck 14. As the truck 14 backs into the loading dock D, the rear peripheral edge 14r of the truck 14 initially engages the panel member 24. The rearward movement of the truck 14 bends the panel member 24 from its straight extended orientation in the disengaged position to an arcuate-shaped orientation in the sealing position. The rear peripheral edges 14r of the truck 14 engage the seal member 22 in response to the rearward movement of the truck 14. The flexible sealing end 22b of the seal member 22 will engage, bend and conform to the contours of the truck surface.

The versatility and effectiveness of the seal assembly 20 is exemplified by the seal member's ability to seal along the interior wall of the cargo bay, along the lateral peripheral edge of the cargo door, or along the exterior wall or along the open door of the truck 14 depending on the specific type, size and position of a truck which enters the loading dock D. Referring to FIG. 7 which illustrates a truck 14 having rear doors which open by sliding upwardly into the ceiling (not shown), it will be seen that the seal assembly 20 engages the interior wall 14a of cargo bay of the truck 14 or the peripheral edge 14r, or both, of the cargo door. The seal member 22 bends and substantially conforms to the surface contours of the interior wall 14a and/or the peripheral edge 14r of the cargo bay. By sealably engaging the truck surface, regardless of the truck's surface configuration, the seal member 22 maximizes the contacting surface area and, thereby, maximizes the seal effectiveness.

The seal assembly 20 is also effective in trucks 14 as shown in FIG. 4. In the illustrated truck, the doors rotate outwardly so that they are substantially adjacent and parallel to the exterior walls and a hinge gap G is formed between the door 16 and the truck wall 14a in the open position. The hinge 18 pivotally connects the door 16 and the truck 14 and typically projects from the peripheral edge 14r. The seal assembly 20 hookedly engages the peripheral edge 14r of the cargo bay as the truck backs into the loading dock and the seal member 22 sealably engages the interior wall of the truck. Although the seal member 22 preferably seals against the truck's interior surface to maximize the effectiveness of the seal, it may also seal against the peripheral edge 14r or exterior wall of the truck, depending, for example, on the size, type, and position of the truck. It will be appreciated that the seal member 22 seals about the gap G. The flexibility of the seal member 22 also enables the seal assembly 20 to bend around the hinge 18 and seal against the surfaces surrounding the hinge 18. By conforming to the contours of the truck surface, an effective seal is created in contrast to conventional rigid and flat-surfaced seals which are unable to accommodate the uneven surface configurations such as the hinge 18, and, thus, leave air gaps between the seal surface and the truck surface.

And finally, in a truck 14 having rear doors 16 which open inwardly toward the building as shown in FIG. 6, or when the truck backs too far into the shelter opening O, or the truck is parked on an incline or off-center such that the seal assembly 20 cannot sealably engage the interior wall, the seal assembly is capable of bending from its initial U-shape to a substantially straight shape so as to sealably engage the exterior wall of the truck 14.

We claim as our invention:

1. A dock seal attached to a loading dock shelter for use with a truck having a rear lateral peripheral end parked adjacent a dock opening, the seal comprising a flexible seal assembly having panel and seal members so as to minimize obstruction of the dock opening and the truck, each of the panel and seal members having first and second ends, the panel member being relatively stiff and the seal member being relatively flexible, wherein the first end of the panel member is attached to the dock shelter for supporting the seal member and the panel member is flexible between a disengaged position in which the panel member extends generally into the path of the incoming truck and a sealing position in which the panel member bends toward the dock opening upon engagement against the truck, and the first end of the seal member is joined to the second end of the panel member and the resilient, flexible second end of the seal member is disposed in the path of the incoming truck so as to engage the incoming truck., wherein the seal member flexes in response to the truck to conform to the contours of the truck end and sealably engage said truck end for forming a substantially air-tight seal, and wherein the cross sectional thickness of the seal member remains substantially unchanged after engagement with the truck.

2. The dock seal as in claim 1 wherein the seal member has a generally hook-shaped cross section before engaging the truck and the seal member flexes between the hook shape and a substantially straight cross section in response to the truck.

3. The dock seal as in claim 1 wherein the panel member is formed of a blend of materials so that the flexibility of the panel member varies from the first end to the second end.

4. The dock seal as in claim 3 wherein the panel member is stiffer at the first end and more flexible at the second end.

5. The dock seal as in claim 1 wherein the seal member is formed of a blend of materials so that the flexibility of the seal member varies from the first end to the second end.

6. The dock seal as in claim5 wherein the seal member is stiffer at the first end and more flexible at the sealing end.

7. The dock seal as in claim 6 wherein the seal is fabricated from ethylene propylene rubber.

8. The dock seal as in claim 7 wherein the seal has a durometer from about 80 to about 90 Shore A.

9. The dock seal as in claim 1 wherein the panel and seal members are formed as separate members and the second end of the panel member is attached to the first end of the seal member.

10. The dock seal as in claim 1 wherein the panel and seal members are formed as an integral member.

11. A loading dock shelter for use with a truck parked adjacent a dock opening wherein the truck has a cargo bay, interior and exterior walls and a rear lateral peripheral end, the dock shelter comprising:

at least one seal assembly flexibly attached to the dock shelter for movement between a disengaged position wherein the seal assembly projects into the path of the incoming truck and a sealing position wherein the seal assembly engages the surface of the rear lateral peripheral end of the truck for forming a substantially air-tight seal, and wherein the seal assembly comprises a relatively stiff panel member and a relatively flexible seal member, the seal member being adapted for resilient, flexible movement between a hook-shaped cross section for hookedly engaging the rear lateral end of the incoming truck in the disengaged position and a substantially straight cross section so as to flexibly conform to the surfaces of the rear lateral end of the truck and to sealably engage the said truck surface to form a substantially air-tight seal, the cross sectional thickness of the seal member being substantially unchanged after engagement with the truck.

12. The loading dock as in claim 10 wherein the seal end is adapted to engage the interior wall of the truck and form a substantially air-tight seal therewith.

13. The loading dock as in claim 10 wherein the seal end is adapted to engage the exterior wall of the truck and form a substantially air-tight seal therewith.

14. The loading dock as in claim 10 wherein the seal member is adapted to seal about a gap defined by door panels and the truck walls after the door panels are pivoted from a closed position wherein the doors extend laterally across the rear of the truck and an open position wherein the doors are disposed adjacent and substantially parallel to the truck walls, so as to form a substantially air-tight seal.

15. The loading dock as in claim 14 wherein the seal member is adapted to engage the interior wall so as to form a substantially air tight seal about the gap.

16. The loading dock as in claim 15 wherein the seal member is adapted to engage the rear lateral peripheral end of the truck so as to form a substantially air tight seal about the gap.

17. A dock seal attached to a loading dock shelter for sealing between a dock opening and a truck having a rear lateral peripheral end, and for sealing a gap between a wall of the truck and an open truck door disposed generally adjacent the wall of the truck, the seal comprising a relatively stiff panel member and a relatively flexible seal member, wherein the resilient panel member is flexible between a disengaged position in which the panel member extends generally into the path of the incoming truck and a sealing position in which the panel member bends toward the dock opening upon engagement against the truck, and the resilient seal member having a first end attached to the second end of the panel member and a flexible sealing second end disposed in the path of the incoming truck so as to sealably engage the interior wall of the incoming truck and to conform to the contours of the truck surface and sealably engage the interior wall of the truck for forming a substantially air-tight seal, the cross sectional thickness of the seal member being substantially unchanged after engagement of the truck.

* * * * *